United States Patent Office 2,728,780
Patented Dec. 27, 1955

2,728,780

CERTAIN MERCAPTO-MERCURI DERIVATIVES OF COUMARIN-3-CARBOXYLIC ACID

Albert Schlesinger, Jackson Heights, Nathan Weiner, Rego Park, and Samuel M. Gordon, Forest Hills, N. Y., assignors to Endo Products Inc., Richmond Hill, N. Y., a corporation of New York No Drawing. Application January 13, 1953, Serial No. 331,107

7 Claims. (Cl. 260—343.2)

This invention relates to novel mercapto-mercuri-derivatives of coumarin-3-carboxylic acid. In particular, it is directed to mercapto-mercuri-propyl derivatives of coumarin-3-carboxylic acid, the aforesaid substituent being in the 8-position of the acid molecule.

The compounds of this invention are especially noteworthy because they dissolve readily in water to produce stable solutions at room temperature by virtue of their high purities. Accordingly, they are well suited for use as diuretics.

It has been recognized that the efficiency of mercapto-mercury compounds as diuretics has been limited by reason of the fact that it is difficult to produce such compounds in stable form, and even more difficult to prepare stable aqueous solutions thereof that may be used for parenteral administration. Heretofore, the most advanced mercapto-mercuri-compound in point of stability, has been distributed in the form of a dry powder. The powder is dissolved in water just prior to the time it is to be administered by injection, even though it is reported that such aqueous solutions are stable for forty (40) days at temperatures up to 80° F.

In the course of the investigations which resulted in the present invention, it was discovered that the novel compounds of this invention can be stored in the form of aqueous solutions thereof at room temperature for unlimited time. Accordingly, such solutions can be put up in ampules and, consequently, the novel compounds of this invention can be distributed in ampule form for administration.

The products of this invention provide marked advantages in that they can be recrystallized to the highest quality, as free acids, as well as in the form of their metal, ammonium or amine salts. Such purification by the recrystallization route contrasts sharply the purification procedures of the known mercapto-mercuri-compounds, the latter being purified only by precipitation. It may well be that the possibility of repeatedly recrystallizing our new products is a critical factor that contributes to the superior stability thereof, and the superior tolerance and diuretic effects thereof.

In the pure recrystallized compounds of our invention there is present exactly one sulphide linkage for each atom of mercury. Such precision is the exact balancing of a sulphide linkage with an atom of mercury, as we are able to achieve, is most likely absent in the previously known mercapto-mercuri-compounds which are produced only by lyophilization. Indeed, it is reported in the scientific literature (Journal of Pharmacy and Pharmacology, volume 111, No. 8, August 1951, page 458) that an excess of sulfhydryl groups can inhibit diuretic effect, and that hydroxy mercuri-compounds can deprive the cells of their essential sulfhydryl-containing metabolites.

In general, the fundamental compounds of this invention have the general formula:

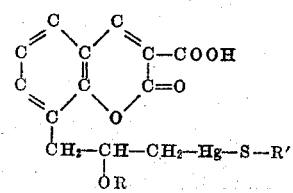

wherein:

R stands for lower alkyl, hydroxy-alkyl, or hydroxy-alkoxy-alkyl, and

R' stands for the radical of sulphydryl compounds, either aliphatic or aromatic, among which are thioglycolic acid, thio-propionic acid, thiobutyric acid, thioglycols, thioglycerol, thiosorbitol, thioglucose, and other compounds containing a sulphydryl group and an acid group and/or one or more hydroxyl groups.

The novel compounds of this invention may be formulated as above set forth by substituting the symbol X in place of the radical—S–R$^1$. If such alternative formulation is employed, then the symbol X designates the entire portion of a sulphhydryl molecule which is linked to the hydrogen atom thereof.

The following are illustrative examples of compounds made in accordance with the present invention.

EXAMPLE 1

8-(3'carboxymethyl-mercapto-mercuri-2'methoxy)-propyl-coumarin-3-carboxylic-acid

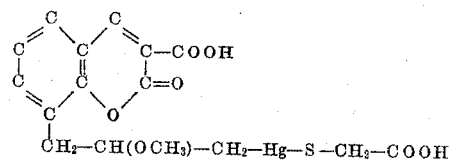

104 grams of 8-(3'-hydroxymercuri-2'-methoxy)-propyl-coumarin-3-carboxylic-acid were suspended in 400 cc. of acetone and cooled in an ice bath. To this suspension there were slowly added with stirring 20 grams of thioglycolic acid dissolved in 10 cc. of acetone. The nearly clear solution was filtered and cooled (in the refrigerator) for 48 hours. A light yellow-colored crystalline precipitate came down, and was filtered on a Buchner funnel, washed with cold acetone and ether and then dried in a desiccator. 108 grams of the mercapto-mercuri-compound of this example were thus obtained. The melting point thereof was 82° C. The product was recrystallized from boiling acetone.

Analysis: $C_{16} - H_{16} - O_7 - S - Hg = 552.6$ molecular weight

|  | Found, Percent | Calculated, Percent |
|---|---|---|
| Hg | 36.3 | 36.1 |
| —S—CH$_2$—COOH | 16.6 | 16.3 |

A clear water solution having a pH of 8.2 was obtained by adding the equivalent amount of sodiumbicarbonate, sodiumhydroxide, ammonia or any water soluble amine.

EXAMPLE 2

*Mono-ammonium salt of 8-(3'-carboxymethyl-mercapto-mercuri-2'-methoxy)-propyl - coumarin - 3 - carboxylic acid*

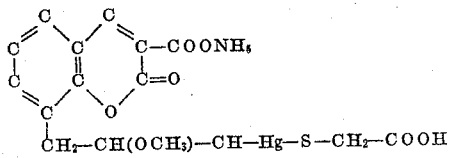
CH₂—CH(OCH₃)—CH—Hg—S—CH₂—COOH 41.6 grams of 8-(3'-hydroxymercuri-2'-methoxy)-propyl-coumarin-3-carboxylic-acid were dissolved in 200 cc. of water with 16 cc. of 28% ammonia. Under a constant nitrogen-atmosphere, 8 grams of thioglycolic acid, dissolved in 20 cc. water, were slowly added. After standing for 5 minutes, 20 cc. of glacial acetic acid were slowly added, and after standing for 30 minutes at room temperature the reaction mixture was cooled in an ice bath for 2 hours. The crystalline mono-ammonium-salt precipitated, of this example, was filtered on a Buchner funnel, first washed with 50 cc. cold water, then with methanol and finally with ether, after which it was dried in a desiccator. There was obtained a yield of 43 grams (92%). It was recrystallized from water, M. P. 165° C.

Analysis: C₁₆—H₁₉—NO₇—S—Hg=569.6 molecular weight

|  | Found, Percent | Calculated, Percent |
| --- | --- | --- |
| Hg | 35.3 | 35.2 |

EXAMPLE 3

*Di-sodium salt of 8-(3'-carboxymethyl-mercapto-mercuri-2'-methoxy)-propyl-coumarin 3-carboxylic-acid*

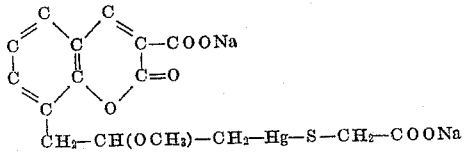
CH₂—CH(OCH₃)—CH₂—Hg—S—CH₂—COONa 20.8 grams of 8-(3'-hydroxymercuri-2'-methoxy)-propyl-coumarin-3-carboxylic acid were suspended in 400 cc. of methanol, and 4 grams of thioglycolic acid, dissolved in 200 cc. methanol, were added. A clear yellow-colored solution was formed. To this solution there were added 6 grams of sodium methoxide dissolved in 400 cc. of methanol. At first a clear solution formed, which, after standing over night, showed a slight precipitation, which was filtered off. The filtered solution was evaporated in vacuum to a volume of 100 to 200 cc., and 500 cc. of acetone were added to the cooled solution. A white crystalline product, 22.9 grams of the di-sodium salt of this example was thus obtained. It was recrystallized from methanol-acetone.

This di-sodium salt is very soluble in water. A 15% solution thereof has a pH of 8.2 and is completely free of irritation on subcutaneous injections.

EXAMPLE 4

*Di-sodium salt of 8-[2'-methoxy-3'-[2''-carboxy] phenyl-mercapto-mercuri-]-propyl - coumarin - 3 - carboxylic-acid*

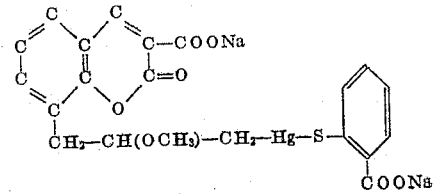

To 9.6 grams of 8-(3'-hydroxymercuri-2'-methoxy)-propyl-coumarin-3-carboxylic-acid there was added a solution of 3.3 grams of thiosalicylic acid and 3.4 grams of sodium bicarbonate in 100 cc. of water. A clear solution having a pH of 8.2 was formed, which was ready for use as an injection.

EXAMPLE 5

*8-[3'-(2''-hydroxy-)ethyl-mercapto - mercuri - 2' - methoxy-]-propyl-coumarin-3-carboxylic-acid-mono sodium salt*

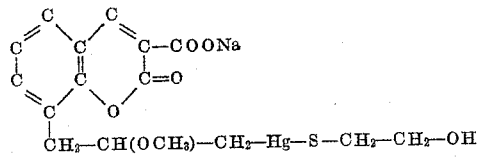
CH₂—CH(OCH₃)—CH₂—Hg—S—CH₂—CH₂—OH

To 9.6 grams of 8-(3'-hydroxymercuri-2'-methoxy)-propyl-coumarin-3-carboxylic-acid there was added a solution of 1.65 grams of sodium bicarbonate and 1.6 grams of 2-mercaptoethanol (HO—CH₂—CH₂—SH) in 100 cc. of water. A clear solution having a pH of 8.2 was formed. This solution does not irritate on injection.

EXAMPLE 6

*Mono-pyridine salt of 8-(3'-carboxymethyl-mercapto-mercuri-2'-methoxy)-propyl - coumarin - 3 - carboxylic acid*

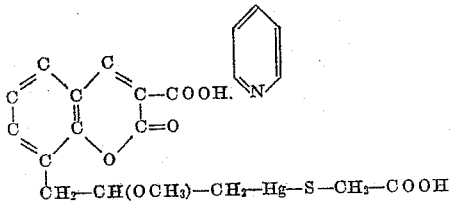
CH₂—CH(OCH₃)—CH₂—Hg—S—CH₂—COOH

To 38 grams of 8-(3'-hydroxy-mercuri-2'-methoxy)-propyl-coumarin-3-carboxylic-acid, suspended in 350 cc. of acetone, there was added 20 grams of pyridine and 10.6 grams of thioglycolic-acid in 50 cc. of acetone. A clear solution was formed, which was cooled for 24 hours in an ice bath. A crystalline precipitate formed, which was filtered on a Buchner funnel, washed with cold acetone and ether and then dried in a desiccator. 42 grams of the mono-pyridine-salt of this example were thus obtained. It was recrystallized from acetone, and had a melting point of 95° C.

EXAMPLE 7

*8-[3'-(1'')-sorbityl-mercapto - mercuri-2'-methoxy-]-propyl-coumarin-3-carboxylic-acid*

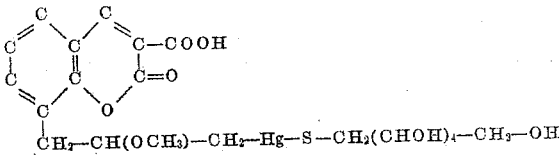
CH₂—CH(OCH₃)—CH₂—Hg—S—CH₂(CHOH)₄—CH₂—OH 9.6 grams of 8-(3'-hydroxymercuri-2'-methoxy)-propyl-coumarin-3-carboxylic-acid were suspended in 50 cc. of methanol and, with stirring, 4 grams of thiosorbitol were added. A clear solution was obtained. 250 cc. of acetone were added and the mixture then cooled in an ice bath. The mercapto-mercuri of this example crystallized out, and was then filtered on a Buchner funnel, following which it was dried in a desiccator. It had a melting point of 110° C. and was obtained in a yield of 14 grams. 7 grams of this acid were dissolved with 0.84 gram of sodium bicarbonate in 50 cc. of water which formed a clear, stable solution having a pH of 7.

EXAMPLE 8

*Disodium salt of 8-[3'-carboxymethyl-mercapto-mercuri-2' - (2" - hydroxy - )ethoxy - ]propyl - coumarin 3 - carboxylic-acid*

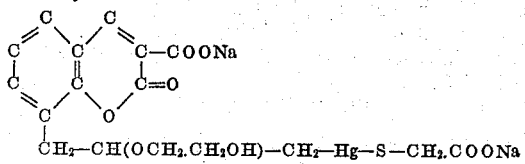

To 10 grams of 8-(3'-hydroxymercuri-2'-(2"-hydroxyethoxy)-propyl-coumarin-3-carboxylic-acid, suspended in 100 cc. of water, there were added 1.6 grams of sodium hydroxide and 1.9 grams of thioglycolic acid. A clear stable solution of the product of this example having a pH of 8.2 was obtained.

EXAMPLE 9

*8 - [3' - carboxymethyl - mercapto - mercuri - 2' - (2" - hydroxy) - propoxy] - propyl - coumarin - 3 - carboxylic acid*

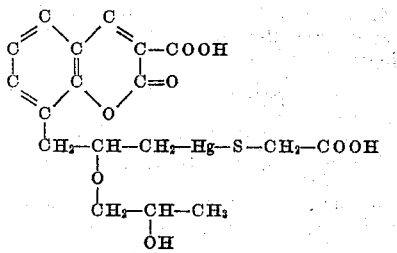

5 grams of 8-[3'-hydroxymercuri-2'-(2"-hydroxy)-propoxy]-propyl-coumarin-3-carboxylic-acid were suspended in 25 cc. of acetone and 1.2 grams of thioglycolic acid were added, with stirring. A clear solution was obtained, which was filtered and cooled in an ice bath for 24 hours. A light yellow colored crystalline precipitate, the product of this example, was formed. It was filtered, dried in a desiccator and had a melting point of 92° C.

By the same method, there was prepared:

EXAMPLE 10

*8 - [3' - carboxymethyl - mercapto - mercuri - 2' - (2",3" - dihydroxy) - n - propoxy - ]propyl - coumarin - 3 - carboxylic acid*

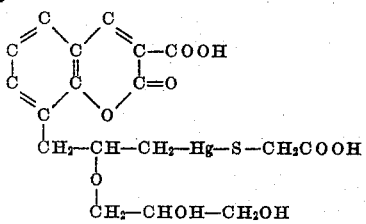

This compound was prepared in accordance with the general procedure described in Example 9, using, as the initial starting material, 8-[3'-hydroxy-mercuri-2'-(2",3"-dihydroxy) - n - propoxy] - propyl - coumarin - 3 - carboxylic acid.

The compound had a melting point of 42° C.

EXAMPLE 11

*8 - [3' - carboxymethyl - mercapto - mercuri - 2' - (2" - (2''' - hydroxy) - n - propoxy) - n - propoxy] propyl - coumarin-3-carboxylic acid*

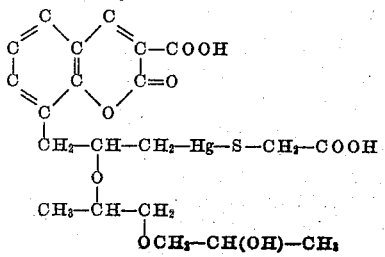

This product was prepared in accordance with the general procedure described in Example 9, using 8-[3'-hydroxy - mercuri - 2' - (2" - (2'''' - hydroxy) - n - propoxy - n - propoxy]propyl - coumarin - 3 - carboxylic acid as the starting material.

The new compound has a melting point of 102° C.

EXAMPLE 12

*8 - [3' - carboxymethyl - mercapto - mercuri - 2' - (4" - hydroxy) - 2" - pentoxy] propyl - coumarin - 3 - carboxylic acid*

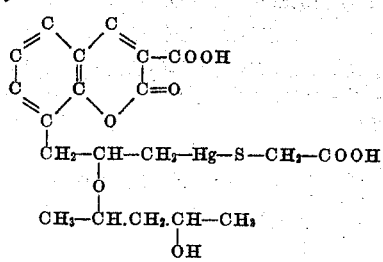

The product was prepared in accordance with the general procedure described in Example 9, using 8-[3'-hydroxy - mercuri - 2' - (4" - hydroxy) - 2" - pentoxy] - propyl-coumarin-3-carboxylic acid as the starting material.

This new compound has a melting point of 84° C.

EXAMPLE 13

*8 - [3' - carboxymethyl - mercapto - mercuri - 2' - (2" - (4" - hydroxy - 4" - methyl) - pentoxy] propyl - coumarin-3-carboxylic acid*

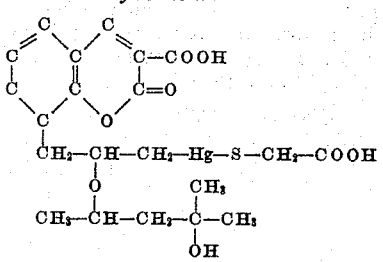

The product of this example was prepared in accordance with the general procedure described in Example 9. The starting material used was 8-[3'-hydroxymercuri-2'-(2" - (4" - hydroxy - 4" - methyl) - pentoxy] propyl - coumarin-3-carboxylic acid.

The new compound has a melting point of 95° C.

EXAMPLE 14

*Di-diethanolamine-salt of 8-(3'-carboxymethyl-mercapto-mercuri - 2' - methoxy) - propyl - coumarin - 3 - carboxylic acid*

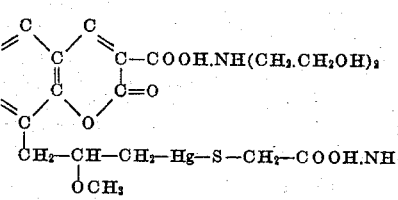

18.4 grams of 8-(3'-hydroxymercuri-2'-methoxy)-propyl-coumarin-3-carboxylic-acid were suspended in 300 cc. of ethanol and 10.4 grams of diethanolamine were added, with stirring. Then 5.4 grams of thioglycolic acid, dissolved in 20 cc. ethanol, were added with stirring. A clear solution was formed, which, after filtering, was cooled in an ice bath. The precipitated, crystalline salt of this example was filtered on a Buchner funnel, washed with cold ethanol and dried in a desiccator.

The product was recrystallized from boiling ethanol. It was obtained in a yield of 24 grams, and had a melting point of 124°.

Analysis: $C_{24}H_{36}N_2O_{11}SHg=762.6$

|  | Calculated, Percent | Found, Percent |
| --- | --- | --- |
| Hg | 26.3 | 25.8 |
| —SCH$_2$COOH | 12.1 | 11.6 |
| —NHC(H$_2$CH$_2$OH)$_2$ | 27.5 | 27.3 |

A 14% aqueous solution of this salt has a pH of 6.5; is stable at room temperature; and is well tolerated when administered by subcutaneous injection.

EXAMPLE 15

Di-ethanolamine salt of 8-(3'-di-hydroxypropyl-mercapto-mercuri - 2' - methoxy) - propyl - coumarin - 3 - carboxylic-acid

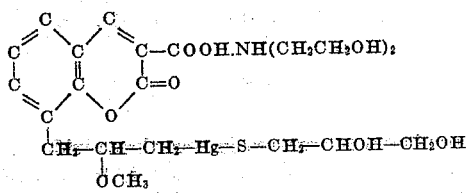

To 50 grams of 8-(3'-hydroxymercuri-2'-methoxy)-propyl-coumarin-3-carboxylic acid, suspended in 400 cc. methanol, there were added 10 grams of diethanolamine and 23 grams of -monothioglycerol with stirring. The nearly clear solution was filtered and the filtrate cooled in an ice bath.

A white crystalline precipitate, the product of this example, was formed. The crystalline product was filtered on a Buchner funnel; washed with cold methanol; and dried in a desiccator. It was recrystallized from boiling methanol until a constant melting point of 135° C. was obtained. The yield was 58 grams.

Analysis: $C_{21}H_{31}NO_9SHg=674.14$

|  | Calculated, Percent | Found, Percent |
| --- | --- | --- |
| Hg | 29.7 | 29.5 |

This salt is very soluble in water. A 14% aqueous solution has a pH of 6.3 and is indefinitely stable at room temperature. Subcutaneous injections thereof are tolerated without any signs of irritation.

The solutions of these compounds in ampules can be heated for as long as 30–45 minutes at 100° C. without any decomposition.

The starting materials employed in carrying out the syntheses of the novel compounds of the foregoing examples were prepared in accordance with the methods set forth in U. S. patent application of Schlesinger, Weiner and Gordon, Ser. No. 58,784, filed November 6, 1948, now Patent 2,667,442 and the pending U. S. patent application of Albert Schlesinger, Ser. No. 289,877, filed May 24, 1952. Such starting materials are hereinafter designated as "Preparation." Preparation 1 is described in the aforesaid application, Ser. No. 58,784. Preparations 2 to 7 are described in the aforesaid application, Ser. No. 289,877.

PREPARATION 1

8-(3' - hydroxymercuri - 2' - methoxy) - propyl - coumarin-3-carboxylic acid

This compound, the starting material employed in Examples 1 to 7, supra, was prepared as follows.

A solution of 115 grams (0.5 mol) of 8-allyl-coumarin-3-carboxylic acid in 3,000 cc. of methanol was placed in a 5-liter flask provided with a stirrer and a dropping funnel. Into the stirred solution there was slowly dropped, during 2 to 3 hours, a solution of 160 grams of mercuric acetate in 2,000 cc. of methanol. The temperature was maintained between 20° C. and 25° C. The mercuric compound of this preparation precipitated as a light yellow powder as the mercuric acid solution was added. After all of the mercuric acetate solution had been added, the stirring was continued for 1 hour. The solid was filtered on a Buchner funnel; and washed four times with 100 cc. portions of methanol; and then with 100 cc. of ether and dried in a desiccator. It had a melting point of 195° C. to 196° C.

PREPARATION 2

8-(3'-hydroxymercuri-2'-hydroxyethoxy)-propyl-coumarin-3-carboxylic acid

This compound, the starting material for Example 8, supra, was prepared as follows:

11.5 grams of 8-allyl-coumarin-3-carboxylic acid were dissolved in 300 cc. of ethylene glycol by stirring and heating to 95° C. To the clear solution there was added a solution of 16 grams of mercuric acetate in 200 cc. of ethylene glycol with stirring. The mixture at first was clear but, on cooling, a white crystalline precipitate appeared. The precipitate, the product of this preparation, was separated on a Buchner funnel, washed with acetone and ether, and then dried for 24 hours at 105° C. The melting point thereof was 195° C. to 196° C.

PREPARATION 3

8-[3'-hydroxymercuri-2'-(2'',3''-dihydroxy)-n-propoxy]-propyl-coumarin-3-carboxylic acid This compound, the starting material used in Example 10, supra, was prepared as follows:

23 grams of 8-allyl-coumarin-3-carboxylic acid were dissolved in 600 cc. of glycerol by heating to 140° C. To this clear solution there was added, with stirring, a solution of 32 grams of mercuric acetate in 400 cc. of glycerol, U. S. P. The mixture was slowly cooled to room temperature with stirring. At this point 800 cc. of ethanol were added to the solution and then cooled in an ice bath. Soon a white crystalline precipitate, the product of this preparation, appeared. It was filtered on a Buchner funnel, washed with ethanol and dried at 105° C. Its melting point was 202° C.

PREPARATION 4

8-[3'-hydroxymercuri-2'-(2''-hydroxy-propoxy)propyl]-coumarin-3-carboxylic acid

This compound, the starting material of Example 9 was prepared as follows.

46 grams of 8-allyl-coumarin-3-carboxylic acid were dissolved in 1200 cc. of propylene glycol by heating to 100° C. To this solution there was added, with stirring, a solution of 64 grams of mercuric acetate in 800 cc. of propylene glycol. The mixture was slowly cooled to room temperature, and then cooled in ice. At this point 1600 cc. of acetone were added with stirring. A white crystalline precipitate, the product of this example, came down and was filtered on a Buchner funnel, washed with acetone and dried at 105° C. It had a melting point of 202° C.

PREPARATION 5

8-[3' - hydroxymercuri - 2' - (2''-(2'''-hydroxy) - n - propoxy)-n-propoxy]-propyl coumarin-3-carboxylic acid This compound, the starting material of Example 11, was prepared as follows.

11.5 grams of 8-allyl-coumarin-3-carboxylic acid were dissolved in 300 cc. of dipropylene glycol at 100° C. To this solution there was added a solution of 16 grams of mercuric acetate in 200 cc. of dipropylene glycol. A precipitate, the product of this example, soon developed, and the precipitation was completed by cooling and the addition of 500 cc. of acetone. The precipitate was filtered on a Buchner funnel, washed with hot acetone, and dried at 105° C. It had a melting point of 158° C.

PREPARATION 6

*8 - [3'-hydroxy-mercuri-2'-(2''-(4'''-hydroxy)-4''-methyl) pentoxy]-propyl-coumarin-3-carboxylic acid*

This compound, the starting material used in Example 13, was prepared as follows:

11.5 grams of 8-allyl coumarin-3-carboxylic acid were dissolved in 300 ml. of 2-methyl pentanediol-2,4 at 100° C. To this solution there was added, with stirring, a solution of 16 grams of mercuric acetate in 200 ml. of 2-methyl pentanediol-2,4. The product of this preparation came down as a precipitate; the precipitation being completed by cooling and adding 500 ml. of acetone. The product was filtered on a Buchner funnel, washed with hot acetone, and dried at 105° C. Its melting point is 159°–160° C.

It will be understood that the foregoing description and the examples set forth are merely illustrative of the principles thereof. Accordingly, the appended claims are to be construed as defining this invention within the full spirit and scope thereof.

We claim:

1. Compounds of the class consisting of 8-(3'-mercapto-mercuri-propyl)-coumarin-3-carboxylic acid, having the formula

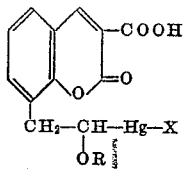

wherein: R is a member of the group consisting of lower alkyl, hydroxylated lower alkyl, lower alkoxy, lower alkyl and hydroxylated (lower alkoxy lower alkyl), X is a member of the group consisting of lower mercapto alcohols, lower mercapto polyhydric alcohols and lower mercapto alkanoic acids and ortho-mercapto benzoic acid minus the mercapto hydrogen atom thereof, and the alkali metal, ammonium, and amine salts of the aforesaid acids.

2. 8-(3'-carboxymethyl-mercapto-mercuri-2'-methoxy)-propyl-coumarin-3-carboxylic acid.

3. 8-[2'- methoxy - 3'-(2''- carboxy)phenyl - mercapto-mercuri]-propyl-coumarin-3-carboxylic acid.

4. 8-[3'-(2''-hydroxy)ethyl-mercapto-mercuri-2'-methoxy]-propyl-coumarin-3-carboxylic acid.

5. 8-[3'-(1'')sorbityl-mercapto - mercuri-2'- methoxy]-propyl-coumarin-3-carboxylic acid.

6. 8-[3'-carboxymethyl - mercapto-mercuri - 2'-(2''-hydroxy)-ethoxy]-propyl-coumarin-3-carboxylic acid.

7. Process of preparing substituted coumarin-3-carboxylic acid compounds of the class having the formula

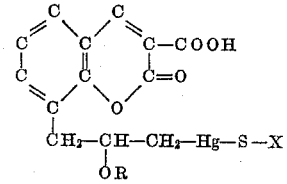

wherein R is a member of the group consisting of alkyl, hydroxylated alkyl, alkoxy alkyl and hydroxylated (alkoxy alkyl), and X is the entire portion of a sulphhydryl molecule which is linked to the hydrogen atom thereof, which comprises reacting (I) a compound of the class having the formula

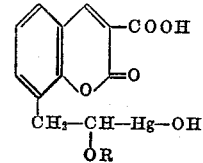

with (II) a sulphhydryl compound having the formula H–X wherein: R and X have the significance above defined.

References Cited in the file of this patent
Sigler et al.: Chem. Abstracts, vol. 45, col. 4348 (1951).